United States Patent
Nieto

(10) Patent No.: US 11,213,012 B2
(45) Date of Patent: Jan. 4, 2022

(54) PORTABLE PET DRYING APPARATUS

(71) Applicant: GRIG SYSTEMS, LLC, Norman, OK (US)

(72) Inventor: James Greg Nieto, Norman, OK (US)

( * ) Notice: Subject to any disclaimer, the term of this patent is extended or adjusted under 35 U.S.C. 154(b) by 195 days.

(21) Appl. No.: 16/507,604

(22) Filed: Jul. 10, 2019

(65) Prior Publication Data

US 2021/0007326 A1 Jan. 14, 2021

(51) Int. Cl.
*A01K 13/00* (2006.01)
*A01K 1/03* (2006.01)

(52) U.S. Cl.
CPC .............. *A01K 13/001* (2013.01); *A01K 1/03* (2013.01)

(58) Field of Classification Search
CPC ........ A01K 13/001; A01K 13/03; A01K 1/02; D06F 57/02; D06F 57/06
See application file for complete search history.

(56) References Cited

U.S. PATENT DOCUMENTS

| | | | | |
|---|---|---|---|---|
| 3,962,993 A * | 6/1976 | Dattilo | ................... | A01K 1/031 |
| | | | | 119/500 |
| 5,193,487 A | 3/1993 | Vogel | | |
| 6,055,937 A * | 5/2000 | Korpi | ....................... | A01K 1/03 |
| | | | | 119/452 |
| 6,688,256 B1 * | 2/2004 | King | ................... | A01K 1/0245 |
| | | | | 119/474 |
| 7,100,538 B2 | 9/2006 | Motomura | | |
| 7,497,188 B2 | 3/2009 | Cho | | |
| 7,581,514 B2 | 9/2009 | Bonfoey | | |
| 7,753,003 B2 * | 7/2010 | Farmer | ................... | E04H 15/48 |
| | | | | 119/499 |
| 8,371,246 B1 | 2/2013 | Streng | | |
| 8,757,096 B2 * | 6/2014 | Doumas | ............... | A01K 13/001 |
| | | | | 119/606 |
| 9,675,047 B2 | 6/2017 | Carter | | |
| 10,143,182 B1 * | 12/2018 | Ferro | ....................... | D06F 18/00 |
| 10,709,103 B1 * | 7/2020 | Kinsey | ................... | F25D 23/063 |

(Continued)

FOREIGN PATENT DOCUMENTS

| | | | | | |
|---|---|---|---|---|---|
| CA | | 2707181 A1 * | 3/2011 | ........... | A01K 13/001 |
| GB | | 2346320 A * | 5/1999 | ............. | D06F 57/04 |
| WO | WO 2018/092168 A4 * | | 5/2018 | ............. | D06F 57/06 |

*Primary Examiner* — Ebony E Evans
(74) *Attorney, Agent, or Firm* — D. Ward Hobson

(57) ABSTRACT

A portable pet drying apparatus is disclosed. Embodiments of the portable pet drying apparatus include a connectable frame. The connectable frame including a plurality of detachably connected members. The portable pet drying apparatus also including a detachable water-resistant cover. The detachable water-resistant cover detachably connected to the connectable frame to form a top surface, bottom surface, front surface, back surface, first side surface and second side surface defining an interior chamber. The front surface having an opening extending therethrough for a pet to enter and exit the interior chamber of the portable pet drying apparatus. In some embodiments, the connectable frame is movable between a stowed position where the interior chamber is at least partially collapsed and a deployed position where the connectable frame is extended so that the detachable water resistant cover defines the interior chamber of the portable pet drying apparatus.

4 Claims, 5 Drawing Sheets

(56) References Cited

U.S. PATENT DOCUMENTS

| | | | |
|---|---|---|---|
| 2005/0229866 A1* | 10/2005 | Simpson | A01K 1/0254 |
| | | | 119/499 |
| 2007/0251463 A1* | 11/2007 | Lu | A01K 1/03 |
| | | | 119/452 |
| 2007/0234970 A1 | 12/2007 | Farzan et al. | |
| 2008/0053379 A1* | 3/2008 | Markewitz | A01K 13/00 |
| | | | 119/600 |
| 2010/0307425 A1* | 12/2010 | Illman | A01K 1/03 |
| | | | 119/499 |
| 2016/0128302 A1* | 5/2016 | Stauber | A01K 13/001 |
| | | | 119/671 |
| 2018/0352783 A1 | 12/2018 | Tuller | |
| 2020/0008390 A1* | 1/2020 | Noordhuizen | A01K 1/0082 |

\* cited by examiner

PORTABLE PET DRYING APPARATUS

FIELD OF INVENTION

The invention is in the technical field of portable and collapsible pet drying devices and methods. More specifically, a portable and collapsible apparatus having a connectable frame and a detachable water-resistant cover for drying and grooming domesticated pets, such as dogs, cats and the like.

BACKGROUND

Domesticated pets, such as dogs, cats and the like often spend significant amounts of time both indoors and outdoors. Pets that spend time outdoors often get wet and muddy, necessitating grooming, cleaning and drying before the pet returns indoors. Traditional options for drying and grooming wet and muddy pets include: (i) bathing and drying the pet outdoors, using a water hose for example; or (ii) bathing and drying the pet indoors, in an area such as a bathtub, kitchen sink, mud room or the like, for example.

Unfortunately, however, traditional outdoor pet bathing, grooming and drying options have significant disadvantages. For example, outdoor bathing and drying options are not always available due to weather conditions, including, for example, rain, hail, snow, wind, extreme heat or cold. Further, if a pet is dried and groomed outdoors, there is a risk that the pet will get loose outside and get wet or muddy again, defeating the purpose of drying or cleaning the pet. In addition, outdoor bathing and drying options are not always readily available, especially for persons residing in areas that do not have sufficient yard or fenced space or access to outdoor water sources. For example, persons living in apartments, urban areas or other housing that has limited outdoor space and limited access to outdoor water sources.

Traditional indoor bathing and drying options also present significant disadvantages. For example, most homes and apartments are not configured with dedicated pet washing and drying stations. Thus, most wet or muddy pets are brought into a home through a front or back door and directly into a living room or kitchen for example. The person then attempts to pick up or transport the pet, usually by carrying the wet or muddy pet using a towel or the like, to a bathtub or kitchen sink for further washing and drying. Because wet or muddy pets often "shake dry", drying a wet or muddy pet indoors often causes water or mud to fling across the home, causing a mess and damage to furniture, clothing and the home itself. Additionally, because many pets do not sit still when wet and muddy, there is always a risk that the wet or muddy pet will get loose from the person and run through the house causing further mess, damage and inconvenience.

To that end, it would be advantageous to provide an improved portable pet drying and grooming apparatus that is configured to be used both indoors and outdoors and that may be conveniently stowed when not in use and deployed when needed. Further, there is a need for the improved portable pet drying apparatus to be configured to be conveniently disassembled for cleaning, washing and the like. Thus, providing numerous advantages over traditional indoor and outdoor pet drying options. It is to such an improved apparatus and to methods for using thereof that exemplary embodiments of the inventive concepts disclosed and claimed herein are directed.

SUMMARY OF THE INVENTION

Embodiments of the invention include a portable pet drying apparatus that includes a connectable frame. The connectable frame including a plurality of detachably connected members. The portable pet drying apparatus further includes a detachable water-resistant cover. The detachable water-resistant cover is detachably connected to the connectable frame to form a top surface, bottom surface, front surface, back surface, first side surface and second side surface defining an interior chamber. In some embodiments, the front surface includes an opening extending therethrough for a pet to enter and exit the interior chamber of the portable pet drying apparatus. In some embodiments, the connectable frame is movable between a stowed position where the interior chamber is at least partially collapsed and a deployed position where the connectable frame is extended such that the detachable water-resistant cover forms the top surface, bottom surface, front surface, back surface, first side surface and second side surface defining the interior chamber of the portable pet drying apparatus.

In some embodiments, the portable pet drying apparatus further includes a system controller. The system controller configured to remotely control, via the internet, the portable pet drying apparatus from a remote computer, such as a desktop computer or mobile phone, for example. In some embodiments, the portable pet drying apparatus further includes a means for providing air flow, such as a fan and blower for example, into the interior chamber of the portable pet drying apparatus. Further, in some embodiments, the portable pet drying apparatus includes a means for spraying water, such as a water hose and spray nozzle, into the interior chamber of the portable pet drying apparatus to clean the pet or clean the portable pet drying apparatus, for example. Further, in some embodiments, the portable pet drying apparatus also includes a means for providing light, such as LED lights, into the interior chamber of the portable pet drying apparatus, for example.

BRIEF DESCRIPTION OF THE SEVERAL VIEWS OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, graphs, drawings, and appendices. In the drawings.

DETAILED DESCRIPTION OF EXEMPLARY EMBODIMENTS

Figure 1:
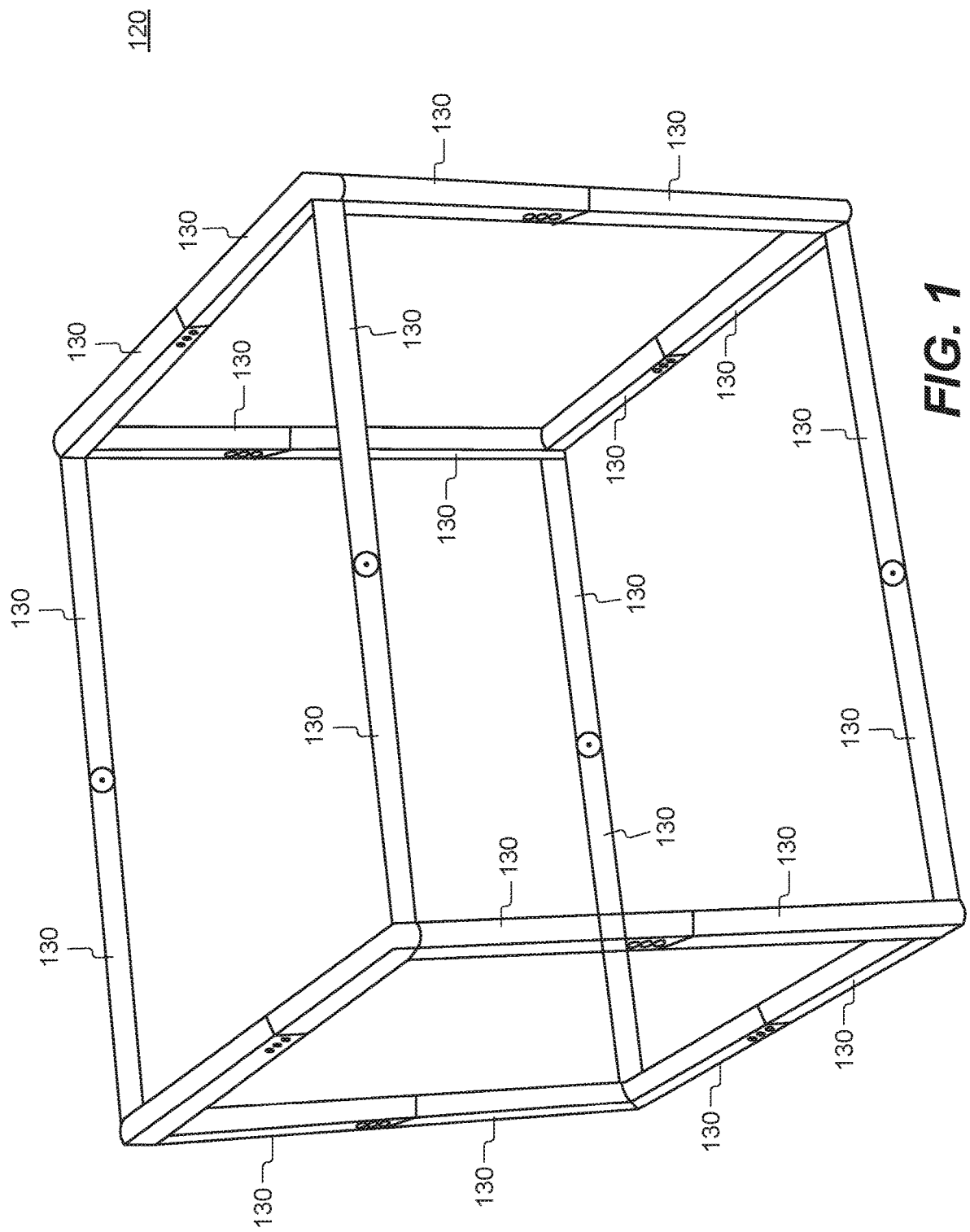
FIG. 1 is a perspective view of the connectable frame (120) of an embodiment of a portable pet drying apparatus (100) in accordance with the inventive concepts disclosed herein.

Before explaining at least one embodiment of the inventive concepts disclosed herein in detail, it is to be understood that the inventive concepts are not limited in their application to the details of construction and the arrangements of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting the inventive concepts claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

As used herein, the terms "comprises," "comprising," "includes," "including," "has," "having," or any other variation thereof, are intended to cover a non-exclusive inclusion. For example, a system, assembly, method, process, article, or apparatus that comprises a list of elements or steps is not necessarily limited to only those elements or steps but may include other elements and steps not expressly listed.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to FIG. 1, shown therein is a perspective view of the connectable frame (120) of an exemplary embodiment of a portable pet drying apparatus (100) in accordance with the inventive concepts disclosed herein. The connectable frame (120) includes a plurality of detachably connected members (130). In some embodiments the connectable frame (120) is movable while in other embodiments the connectable frame (120) does not move once the plurality of detachably connected members (130) are connected together to form the connectable frame (120). The connectable frame (120) may be constructed of any desired material, including but not limited to, plastic, wood, metals, alloys, non-metals, steel, titanium, carbon fiber, polymers, resins, ceramics, composite materials or combinations thereof and the like. In some embodiments, the connectable frame (120) is configured in a generally rectangular shape. However, it should be understood that the connectable frame (120) may be configured in any desired shape, including, but not limited to, a circular, square, triangular shape, combinations thereof and the like as will be appreciated by persons of ordinary skill in the art having the benefit of the instant disclosure.

Further, embodiments of the connectable frame (120) may include reinforcing or bracing structures, such as struts, ribs, braces, rods, cable, rope or any other suitable reinforcing or bracing structure, combinations thereof and the like. In some embodiments, the connectable frame (120) may contain electrical wires, electrical outlets, video or audio components, conduit, computers, batteries, Universal Serial Bus ("USB") ports, fans, audio speakers, fasteners and a variety of other electronic media connections, outlets and applications. Further, the connectable frame (120) may contain components sufficient to establish an internet or network connection with various electronic media devices and applications, for example.

The plurality of detachably connected members (130) are used to form the connectable frame (120) of the portable pet drying apparatus (100). The plurality of detachably connected members (130) may be constructed of any desired material, including but not limited to, plastic, wood, metals, alloys, non-metals, steel, titanium, carbon fiber, polymers, resins, ceramics, composite materials or combinations thereof and the like. In some embodiments, the plurality of detachably connected members (130) are configured in a generally rectangular shape. However, it should be understood that the plurality of detachably connected members (130) may be configured in any desired shape, including, but not limited to, a circular, square, triangular shape, combinations thereof and the like as will be appreciated by persons of ordinary skill in the art having the benefit of the instant disclosure.

The detachably connected members (130) may be connected to each other to form the connectable frame (120) such that when connected the connectable frame (120) is movable from a stowed position to a deployed position. Alternatively, in some embodiments, the connectable frame (120) may be formed to not be movable once the plurality of detachably connected members (130) are connected. The detachably connected members (130) may be connected via a plurality of movable joints to permit the connectable frame (120) to move from a stowed position to a deployed position as described herein. The plurality of movable joints may contain screws, bolts, pins, combinations thereof and the like for example. As will be appreciated by one of ordinary skill in the art having the benefit of this disclosure, the detachably connected members (130) may be connected via any desired manner sufficient to permit the detachably connected members (130) to collapse, bend or fold so that the connectable frame (120) may be automatically expanded or contracted so that the connectable frame (120) may be automatically stored when not in use or automatically expanded for use when needed. Alternatively or in combination therewith, the detachably connected members (130) may also contain threaded portions that screws into an opening in the top of each of the detachably connected members (130) to connect and disconnect the detachably connected members (130) to form the connectable frame (120). It is to be appreciated that the detachably connected members (130) may be connected and disconnected in any desired manner, including, but not limited to, joints, screws, bolts, rope, cables, string, grooves, latches, combinations thereof and the like, for example.

Further, embodiments of the plurality of detachably connected members (130) may include reinforcing or bracing structures, such as struts, ribs, braces, rods, cable, rope or any suitable reinforcing bracing structure, combinations thereof and the like. In some embodiments, the plurality of detachably connected members (130) may contain wires, electrical outlets, video or audio components, conduit, computers, batteries, Universal Serial Bus ("USB") ports, fans, audio speakers, fasteners and a variety of other electronic media applications. The plurality of detachably connected members (130) may contain components sufficient to establish an internet or network connection with various electronic media devices and applications.

In some embodiments, the plurality of detachably connected members (130) may further include a removable outer sleeve configured to hide at least some of the electrical components used for the operation of the portable pet drying apparatus (100). The sleeve may also provide protection to a user from such electrical components and protection from water, mud and the like. The sleeve may also be removed, washed and reused.

Figure 2:
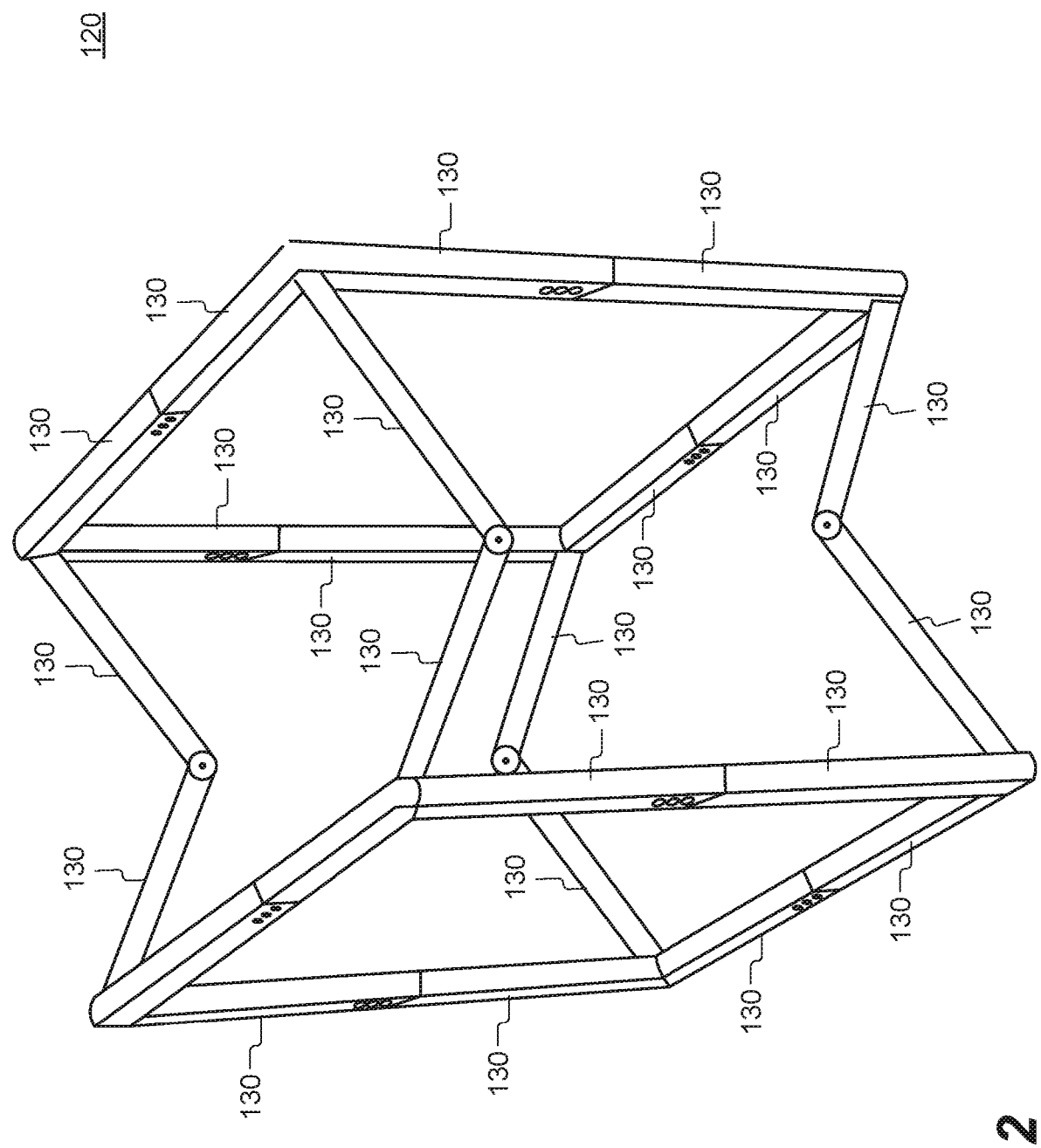
FIG. 2 is a perspective view of the connectable frame (120) of FIG. 1 shown in a stowed position.

Referring now to FIG. 2, shown therein is a perspective view of the connectable frame (120) of the portable pet drying apparatus (100) shown in a stowed position (190). The plurality of detachably connected members (130) are shown connected to each other to form the connectable frame (120) via a plurality of movable joints that permit the connectable frame (120) and the portable pet drying apparatus (100) to move between a stowed position (190) where the interior chamber (175) is partially collapsed (shown in FIG. 4) and a deployed position (200) where the plurality of detachably connected members (130) are fully extended (shown in FIG. 3). The plurality of movable joints may contain screws, bolts, pins, combinations thereof and the like for example.

The detachably connected members (130) may be connected via any desired manner sufficient to permit the detachably connected members (130) to collapse, bend or fold so that the connectable frame (120) may be automatically expanded or contracted so that the connectable frame (120) may be automatically stored when not in use or automatically deployed for use when needed. Alternatively or in combination therewith, the detachably connected members (130) may also contain threaded portions that screws into an opening in the top of each of the detachably connected members (130) to connect and disconnect the detachably connected members (130) to form the connectable frame (120). It is to be appreciated that the detachably connected members (130) may be connected and disconnected in any desired manner, including, but not limited to, joints, screws, bolts, rope, cables, string, grooves, latches, combinations thereof and the like, for example.

Figure 3:
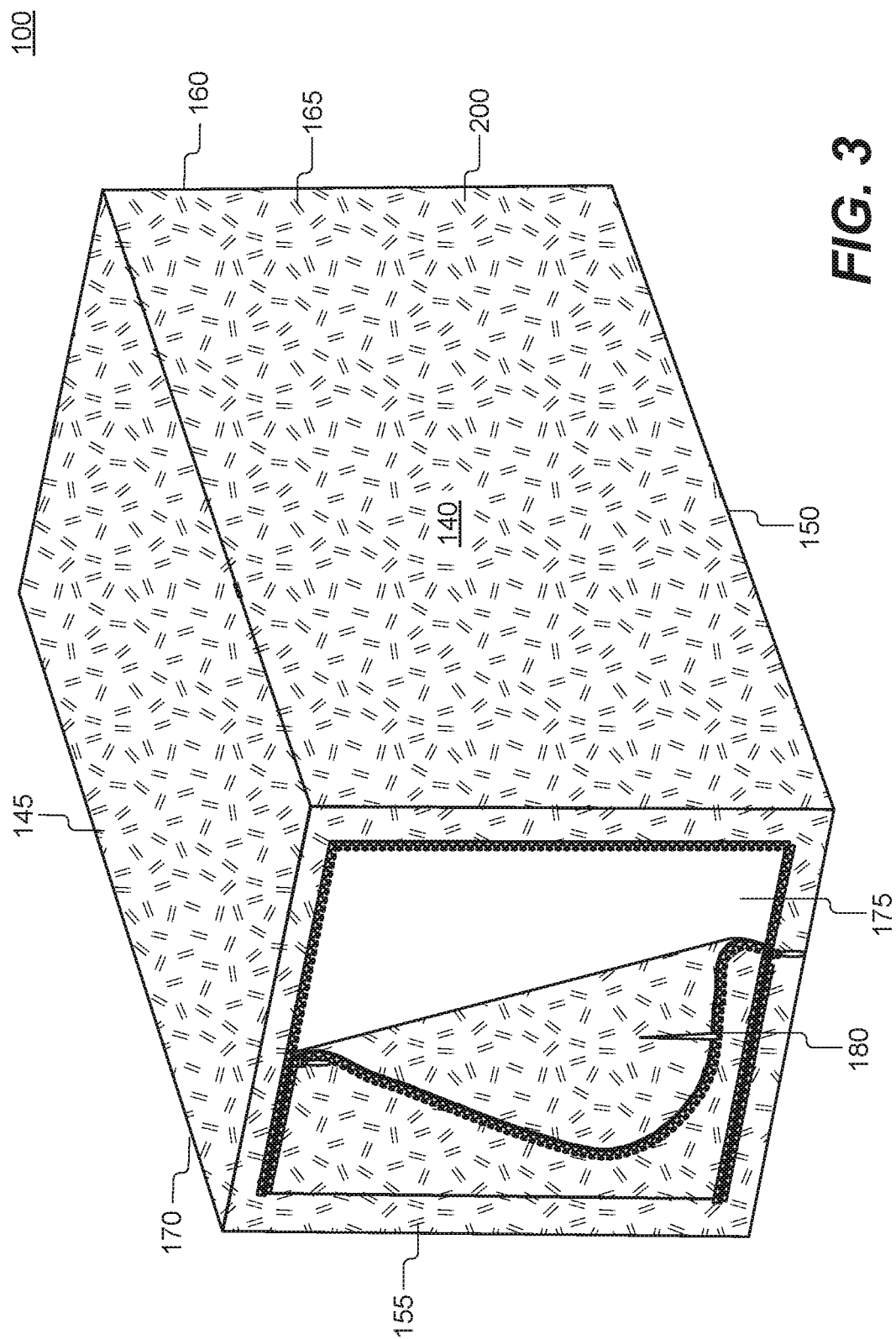
FIG. 3 is a perspective view of a detachable water-resistant cover (140) of an embodiment of a portable pet drying apparatus (100) in accordance with the inventive concepts disclosed herein.

Referring now to FIG. 3, shown therein is a detachable water-resistant cover (140) of an exemplary embodiment of a portable pet drying apparatus (100) in accordance with the inventive concepts disclosed herein in a deployed position (200). The detachable water-resistant cover (140) is detachably connected to the connectable frame (120) to form a top surface (145), bottom surface (150), front surface (155), back surface (160), first side surface (165) and second side surface (170) defining an interior chamber (175). The front surface (155) having an opening (180) extending therethrough for a pet to enter and exit the interior chamber (175) of the portable pet drying apparatus (100).

The opening (180) may be formed from the detachable water-resistant cover (140) or may be formed or constructed from a separate component and connected thereto. For example, the detachable water-resistant cover (140) may include a zipper, adhesive, hinge or other connecting means for example. The hinge may be implemented as a single hinge substantially spanning the length of the opening (180) or as one or more separate hinges operably coupled to the detachable water-resistant cover (140). In some embodiments, the hinge may also include a clamp or other mechanism operably coupled therewith so as to secure the water-resistant cover (140) at a desired portion. In some embodiments, the hinge may also include one or more pneumatic, hydraulic, elastomeric, mechanical, or any other desired clamping, pivoting, or securing mechanism to allow a pet to safely enter and exit the portable pet drying apparatus (100) as described herein. Further, in some embodiments, the hinge may be implemented as a locking hinge configured to lock the detachable water-resistant cover (140) to a desired angle, or may be configured to limit the movement of the water-resistant cover (140) or reduce the size or angle of the opening (180) relative to the water-resistant cover (140) at any desired angle, as will be appreciated by persons of ordinary skill in the art having the benefit of the instant disclosure.

The detachable water-resistant cover (140) may be constructed from plastics, resins, coatings, ultra violet (UV) materials, fibers, metals, non-metals, cotton, canvas, polyvinyl-chloride (PVC), PVC coated canvas, nylon, polyester, carbon fiber, composite materials, combinations thereof and the like. The detachable water-resistant cover (140) may be transparent, clear, frosted, or opaque.

Further, the detachable water-resistant cover (140) may have pockets, fasteners, zippers, holes, rings, loops, screws, bolts, pins, rope, string, rods, cables or the like to detachably connect the water-resistant cover (140) to the plurality of detachably connected members (130) and to form the connectable frame (120). For example, in some embodiments, the plurality of detachably connected members (130) may be hollow and have cables, rope, rods or pins inserted therein for connection and disconnection thereto. Alternatively, or in combination with the above connectors, the ends of each of the detachably connected members (130) may have screw tops to enable each such detachably connected member (130) to be detachably connected and detachably connected to the water-resistant cover (140).

Figure 4:
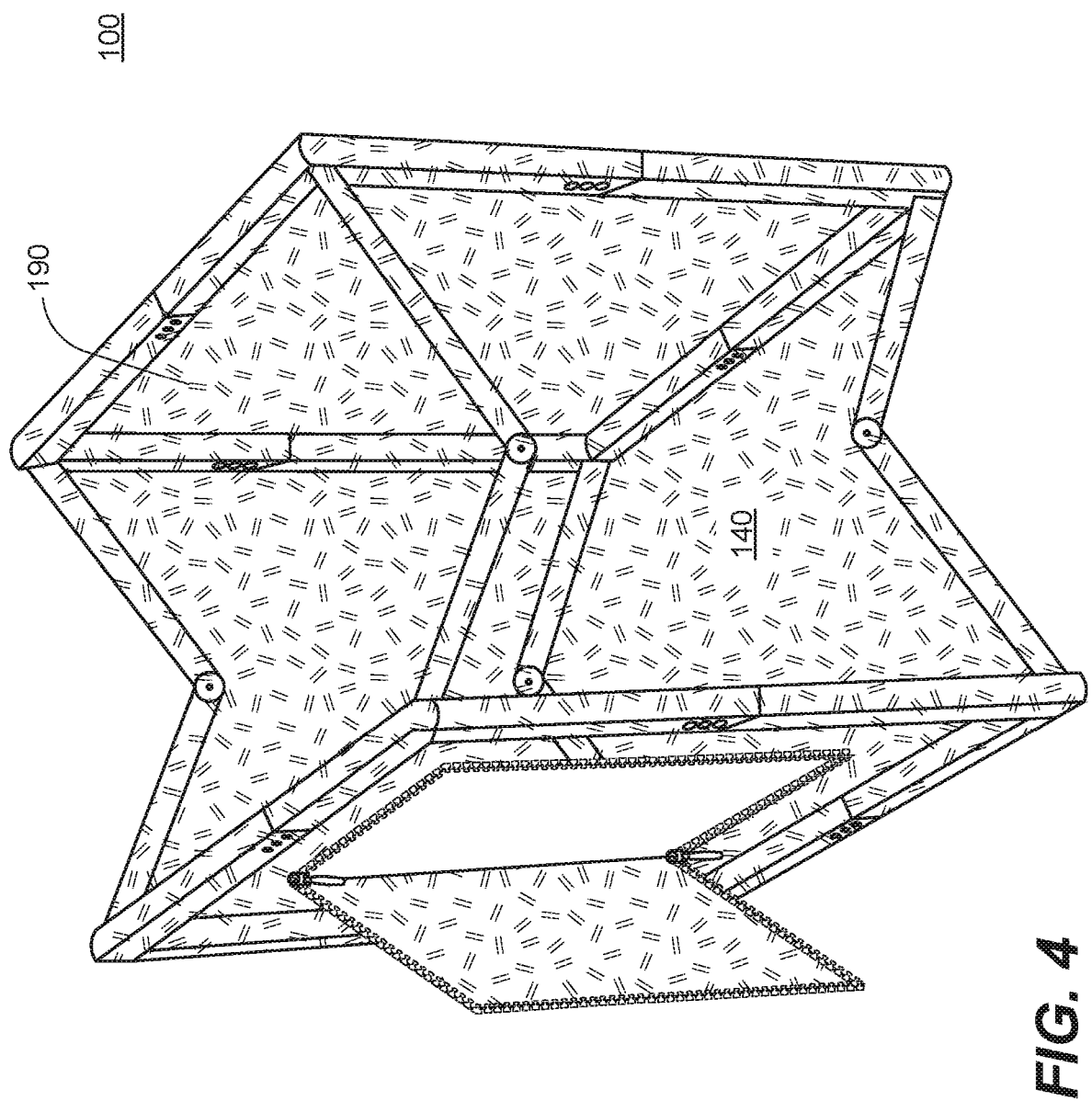
FIG. 4 is a perspective view of a portable pet drying apparatus (100) in a stowed position in accordance with the inventive concepts disclosed herein.

Referring now to FIG. 4, shown therein is a perspective view of an exemplary embodiment of a portable pet drying apparatus (100) in a stowed position (190) in accordance with the inventive concepts disclosed herein. The connectable frame (120) of the portable pet drying apparatus (100) is movable between a stowed position (190) where the interior chamber (175) is at least partially collapsed and a deployed position (200) where the connectable frame is extended and the detachable water-resistant cover (140) is connected to the connectable frame (120) to form the top surface (145), bottom surface (150), front surface (155), back surface (160), first side surface (165) and second side surface (170) defining the interior chamber (175) of the portable pet drying apparatus (100). The front surface (155) having an opening (180) extending therethrough for a pet to enter and exit the interior chamber (175) of the portable pet drying apparatus (100).

The opening (180) may be formed from the detachable water-resistant cover (140) or may be formed or constructed from a separate component and connected thereto. For example, the detachable water-resistant cover (140) may include a hinge, which may be implemented as a single hinge substantially spanning the length of the opening (180) or as one or more separate hinges operably coupled to the detachable water-resistant cover (140). In some embodiments, the hinge may also include a clamp or other mechanism operably coupled therewith so as to secure the water-resistant cover (140) at a desired position. In some embodiments, the hinge may also include one or more pneumatic, hydraulic, elastomeric, mechanical, or any other desired clamping, pivoting, or securing mechanism so as to allow a pet to safely enter and exit the portable pet drying apparatus (100) as described herein. Further, in some embodiments, the hinge may be implemented as a locking hinge configured to lock the detachable water-resistant cover (140) to a desired angle, or may be configured to limit the movement of the water-resistant cover (140) or reduce the size or angle of the opening (180) relative to the water-resistant cover (140) at any desired angle, as will be appreciated by persons of ordinary skill in the art having the benefit of the instant disclosure.

The detachable water-resistant cover (140) may be constructed from plastics, resins, coatings, ultra violet (UV) materials, fibers, metals, non-metals, cotton, canvas, polyvinyl-chloride (PVC), PVC coated canvas, nylon, polyester, carbon fiber, composite materials, combinations thereof and the like. The detachable water-resistant cover (140) may be transparent, clear, frosted, or opaque.

Further, the detachable water-resistant cover (140) may have pockets, fasteners, zippers, holes, rings, loops, screws, bolts, pins, rope, string, rods, cables or the like to detachably connect the water-resistant cover (140) to the plurality of detachably connected members (130) and to form the connectable frame (120). For example, in some embodiments, the plurality of detachably connected members (130) may be hollow and have cables, rope, rods or pins inserted therein for connection and disconnection thereto. Alternatively, or in combination with the above connectors, the ends of each of the detachably connected members (130) may have screw tops to enable each such detachably connected member (130) to be detachably connected and detachably connected to the water-resistant cover (140).

Figure 5:
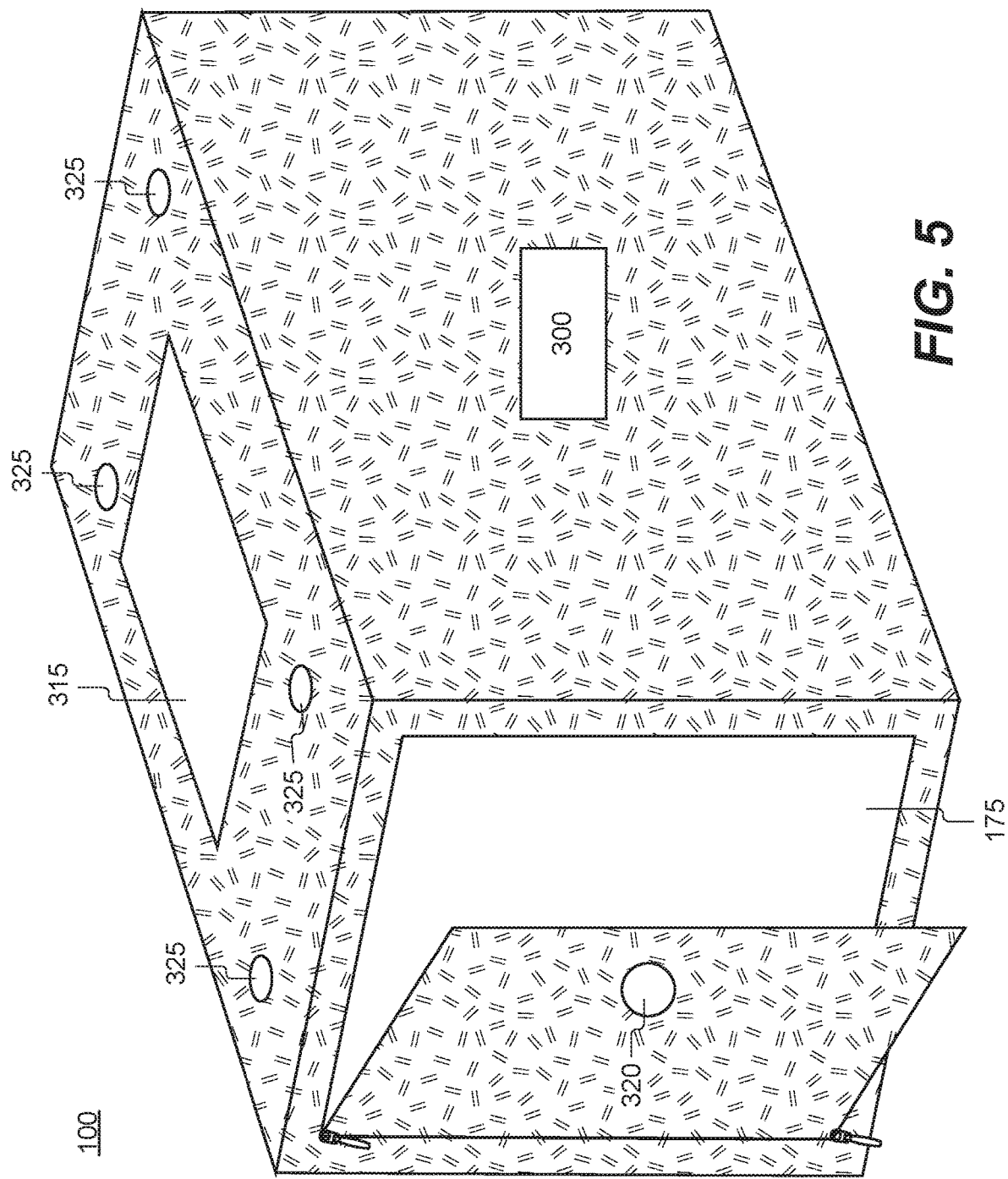
FIG. 5 is a perspective view of an embodiment of a portable pet drying apparatus (100) in accordance with the inventive concepts disclosed herein.

Referring now to FIG. 5, shown therein is a perspective view of an embodiment of a portable pet drying apparatus (100) in accordance with the inventive concepts disclosed herein. As shown in FIG. 5, in some embodiments, the portable pet drying apparatus (100) further includes a system controller (300), a means for providing air flow (315) such as a fan and blower, a means for spraying water (320) such as a water hose and nozzle, and a means for providing light (325) such as one or more light bulbs or LED lights, for example. It should be understood that the portable pet drying apparatus (100) may include a variety of components and tools, including, for example, pet toys, speakers, video cameras and various other audio or visual components combinations thereof and the like.

The system controller (300) is configured to control the portable pet drying apparatus (100). For example, the system controller (300) can be configured to automatically cause the portable pet drying apparatus (100) to automatically move from a stowed position (190) to a deployed position (200), automatically open or close the opening (180), automatically turn on or off one or more fan (315), one or more light (325), speakers, or video cameras located on or within the portable pet drying apparatus (100), or to broadcast data, such as video, audio or other data or information to or from the remote computer (305). The system controller (300) may be a computer, or similar electronic device, such as a cellular telephone for example, configured for storing, sending, receiving and processing data, typically in binary form, according to instructions given to it by a computer program or application. The system controller (300) is configured to be in wireless communication with the remote computer (305) and configured to control the portable pet drying apparatus (100).

Similarly to the system controller (300), the remote computer (305) may be configured to control the portable pet drying apparatus (100) and control the system controller (300). In some embodiments, the system controller (300) and remote computer (305) are configured to control the portable pet drying apparatus (100) over the internet, worldwide web, or a local, private, or other secure data network. Preferably, the remote computer (305) communicates with the system controller (300) through a wireless communications network. Wireless communications networks are known in the art and generally include any type of computer network that uses wireless data. Examples of wireless communications networks include, cell phone networks, Wi-Fi networks, Bluetooth®, terrestrial microwave or radio wave networks, and the like. It should be understood however, that in some embodiments, the system controller (300) may communicate with the remote computer (305) using ground or land wires or cables physically connected or partially physically connected between the remote computer (305) and the system controller (300).

It is to be appreciated that the portable pet drying apparatus (100) may be shipped fully or partially assembled or disassembled in the form of a kit, as will be readily appreciated by persons of ordinary skill in the art having the benefit of the instant disclosure.

A person may use the portable pet drying apparatus (100) as follows. Under ordinary circumstances, the portable pet drying apparatus (100) is maintained with the connectable frame (120) disassembled or in a stowed position (190). In the stowed position (190) the plurality of detachably connected members (130) are partially disconnected, folded or collapsed. In some embodiments, the connectable frame (120) may be fully or partially disassembled such that each of the plurality of detachably connected members (130) may be connected and disconnected to form the connectable frame (120). The connectable frame (120) may be partially disassembled and folded or separated and disconnected for convenient storage when not in use.

To connect the portable pet drying apparatus (100), a person connects the plurality of detachably connected members (130) to form the connectable frame (120). A person connects the detachable water-resistant cover (140) to the connectable frame (120) such that the detachable-water resistant cover stretches over the connectable frame (120) to form the interior chamber (175). Once fully assembled, a person then directs a pet through the opening (180) of the portable pet drying apparatus (100) and into the interior chamber (175). Once inside the interior chamber (175) of the portable pet drying apparatus (100), a person may wash and dry the pet in the portable pet drying apparatus (100).

From the above description, it is clear that the inventive concepts disclosed herein are adapted to carry out the objects and to attain the advantages mentioned herein as well as those inherent in the inventive concepts disclosed herein. While exemplary embodiments of the inventive concepts disclosed herein have been described for purposes of this disclosure, it will be understood that numerous changes may be made which will readily suggest themselves to those skilled in the art and which are accomplished within the broad scope of the inventive concepts disclosed herein and defined by the appended claims.

What is claimed is:

1. A portable pet drying apparatus comprising:
   a connectable frame, the connectable frame comprising a plurality of detachably connected members:
   a detachable water-resistant cover, the detachable water-resistant cover detachably connected to the connectable frame to form a top surface, bottom surface, front surface, back surface, first side surface and second side surface defining an interior chamber, the front surface having an opening extending therethrough for a pet to enter and exit the interior chamber of the portable pet drying apparatus; and a system controller, the system controller detachably connected to the connectable frame the system controller configured to remotely control the movement of the portable pet drying apparatus wirelessly from a remote computer, such that the connectable frame is automatically movable from the remote computer between a stowed position where the interior chamber is at least partially collapsed and a deployed position where the connectable frame is extended so that the detachable water-resistant cover forms the top surface, bottom surface, front surface, back surface, first side surface and second side surface defining the interior chamber of the portable pet drying apparatus.

2. The portable pet drying apparatus of claim 1 further comprising a means for providing air flow into the interior chamber of the portable pet drying apparatus, the means for providing air flow detachably connected to the connectable frame and controlled by the system controller wirelessly from a remote computer.

3. The portable pet drying apparatus of claim 1 further comprising a means for spraying water into the interior chamber of the portable pet drying apparatus, the means for spraying water detachably connected to the connectable frame and controlled by the system controller wirelessly from a remote computer.

4. The portable pet drying apparatus of claim 1 further comprising a means for providing light into the interior chamber of the portable pet drying apparatus, the means for providing light detachably connected to the connectable frame and controlled by the system controller wirelessly from a remote computer.

* * * * *